United States Patent
Lanka et al.

(10) Patent No.: US 11,954,360 B2
(45) Date of Patent: Apr. 9, 2024

(54) TECHNOLOGY TO PROVIDE ACCURATE TRAINING AND PER-BIT DESKEW CAPABILITY FOR HIGH BANDWIDTH MEMORY INPUT/OUTPUT LINKS

(71) Applicant: Intel Corporation, Santa Clara, CA (US)

(72) Inventors: Narasimha Lanka, Dublin, CA (US); Kuljit Bains, Olympia, WA (US); Lohit Yerva, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 706 days.

(21) Appl. No.: 17/009,241

(22) Filed: Sep. 1, 2020

(65) Prior Publication Data

US 2020/0393997 A1 Dec. 17, 2020

(51) Int. Cl.
*G06F 3/06* (2006.01)
*G06F 11/10* (2006.01)
*G06F 13/16* (2006.01)
*G06N 20/00* (2019.01)

(52) U.S. Cl.
CPC .......... *G06F 3/0659* (2013.01); *G06F 3/0608* (2013.01); *G06F 3/0679* (2013.01); *G06F 11/1004* (2013.01); *G06F 13/1668* (2013.01); *G06N 20/00* (2019.01)

(58) Field of Classification Search
CPC .... G06F 3/0659; G06F 3/0608; G06F 3/0679; G06F 11/1004; G06F 13/1668; G06N 20/00
See application file for complete search history.

(56) References Cited

U.S. PATENT DOCUMENTS

| 9,136,021 B2 | 9/2015 | Yang et al. | |
| 2007/0230687 A1* | 10/2007 | Talbot | H04L 25/45 380/28 |
| 2011/0208954 A1 | 8/2011 | Barrett et al. | |
| 2012/0185654 A1* | 7/2012 | Kim | G06F 7/582 711/E12.001 |
| 2012/0221775 A1 | 8/2012 | Kim et al. | |
| 2014/0317419 A1 | 10/2014 | Cooke | |

(Continued)

OTHER PUBLICATIONS

International Search Report and Written Opinion for PCT Patent Application No. PCT/US2021/043915 dated Nov. 12, 2021, 10 pages.

(Continued)

*Primary Examiner* — Charles Rones
*Assistant Examiner* — Jonah C Krieger
(74) *Attorney, Agent, or Firm* — Jordan IP Law LLC

(57) ABSTRACT

Systems, apparatuses and methods may provide for technology that programs a plurality of seed values into a plurality of linear feedback shift registers (LFSRs), wherein the plurality of LFSRs correspond to a data word (DWORD) and at least two of the plurality of seed values differ from one another. The technology may also train a link coupled to the plurality of LFSRs, wherein the plurality of seed values cause a parity bit associated with the DWORD to toggle while the link is being trained. In one example, the technology also automatically selects the plurality of seed values based on one or more of an expected traffic pattern on the link (e.g., after training) or a deskew constraint associated with the link.

20 Claims, 9 Drawing Sheets

(56) References Cited

U.S. PATENT DOCUMENTS

| 2016/0085622 | A1* | 3/2016 | Andre | H04L 1/0045 |
| | | | | 714/764 |
| 2019/0042380 | A1* | 2/2019 | Das Sharma | G06F 13/4295 |
| 2019/0238179 | A1* | 8/2019 | Iyer | G06F 13/20 |
| 2020/0393997 | A1 | 12/2020 | Lanka et al. | |

OTHER PUBLICATIONS

Jedec, "Committee Letter Ballot, Proposed HBM3 Loopback Test Modes (MISR/LFSR)," Jul. 20, 2020, 13 pages.
J. Koeter, "What's an LFSR?" Texas Instruments Manual, <ti.com/lit/an/scta036a/scta036a.pdf>, Dec. 1996, 12 pages.
Wikipedia, "Linear-feedback shift register", <en.wikipedia.org/wiki/Linear-feedback_shift_register>, retrieved Jul. 16, 2020, 12 pages.
PCT Patent Application No. PCT/CN2020/076352, entitled "Implementing External Memory Training at Runtime," filed on Feb. 24, 2020, 26 pages.

* cited by examiner

40

| VSS | -- | VSS | -- | VSS | -- | VSS | -- | VSS | -- | VSS | -- |
|---|---|---|---|---|---|---|---|---|---|---|---|
| LFSR-1 | DQa7 | -- | DQa5 | -- | RDa0 | -- | DQa3 | -- | DQa1 | -- | ECCa0 |
| DBIa0 | -- | DQa6 | -- | DQa4 | -- | DPARa0 | -- | DQa2 | -- | DQa0 | -- |
| -- | VDDQL | -- | VDDQL | -- | VDDQL | -- | VDDQL | -- | VDDQL | -- | VDDQL |
| DBIa1 | -- | DQa14 | -- | DQa12 | -- | WDQSa0_t | -- | DQa10 | -- | DQa8 | -- |
| LFSR-2 | DQa15 | -- | DQa13 | -- | WDQSa0_o | -- | DQa11 | -- | DQa9 | -- | ECCa1 |
| VDDQ | -- | VDDQ | -- | VDDQ | -- | VDDQ | -- | VDDQ | -- | VDDQ | -- |
| -- | VSS | -- | VSS | -- | VSS | -- | VSS | -- | VSS | -- | VSS |
| DBIa2 | -- | DQa22 | -- | DQa20 | -- | RDQSa0_t | -- | DQa18 | -- | DQa16 | -- |
| LFSR-3 | DQa23 | -- | DQa21 | -- | RDQSa0_o | -- | DQa19 | -- | DQa17 | -- | SEVa0 |
| VDDQL | -- | VDDQL | -- | VDDQL | -- | VDDQL | -- | VDDQL | -- | VDDQL | -- |
| -- | DQa31 | -- | DQa29 | -- | RDa1 | -- | DQa27 | -- | DQa25 | -- | SEVa1 |
| LFSR-4 | -- | DQa30 | -- | DQa28 | -- | DERRa0 | -- | DQa26 | -- | DQa24 | -- |
| DBIa3 | VDDQ | -- | VDDQ | -- | VDDQ | -- | VDDQ | -- | VDDQ | -- | VDDQ |

FIG. 3

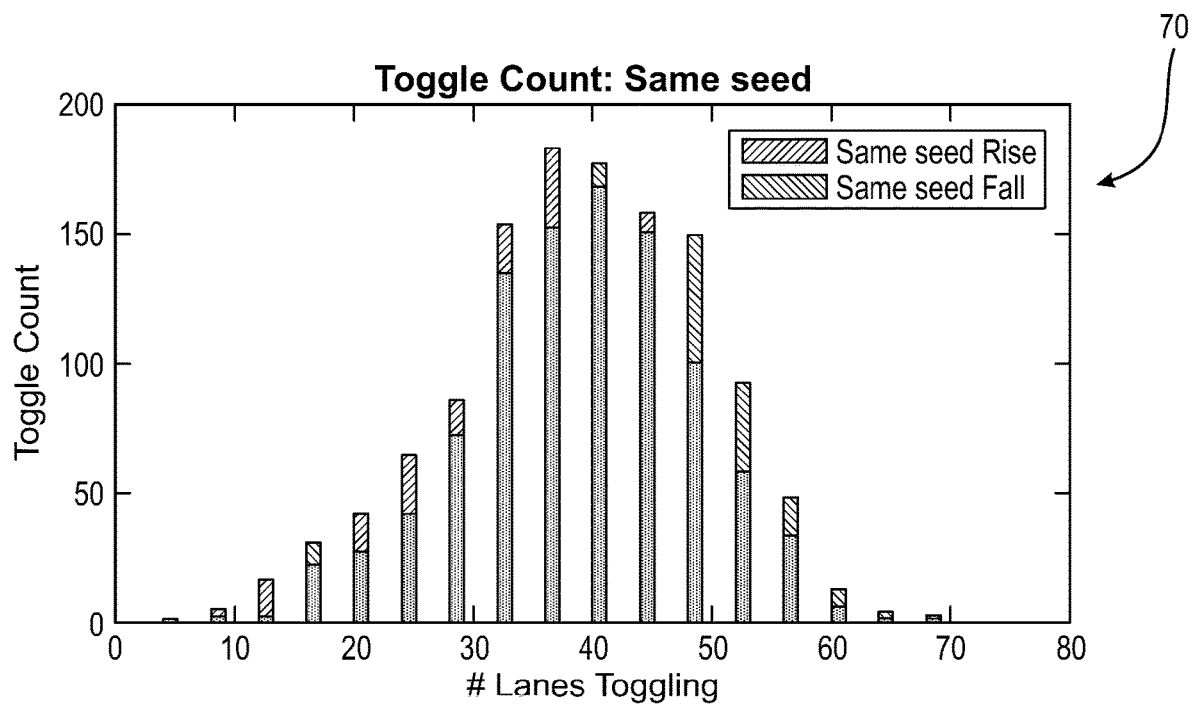
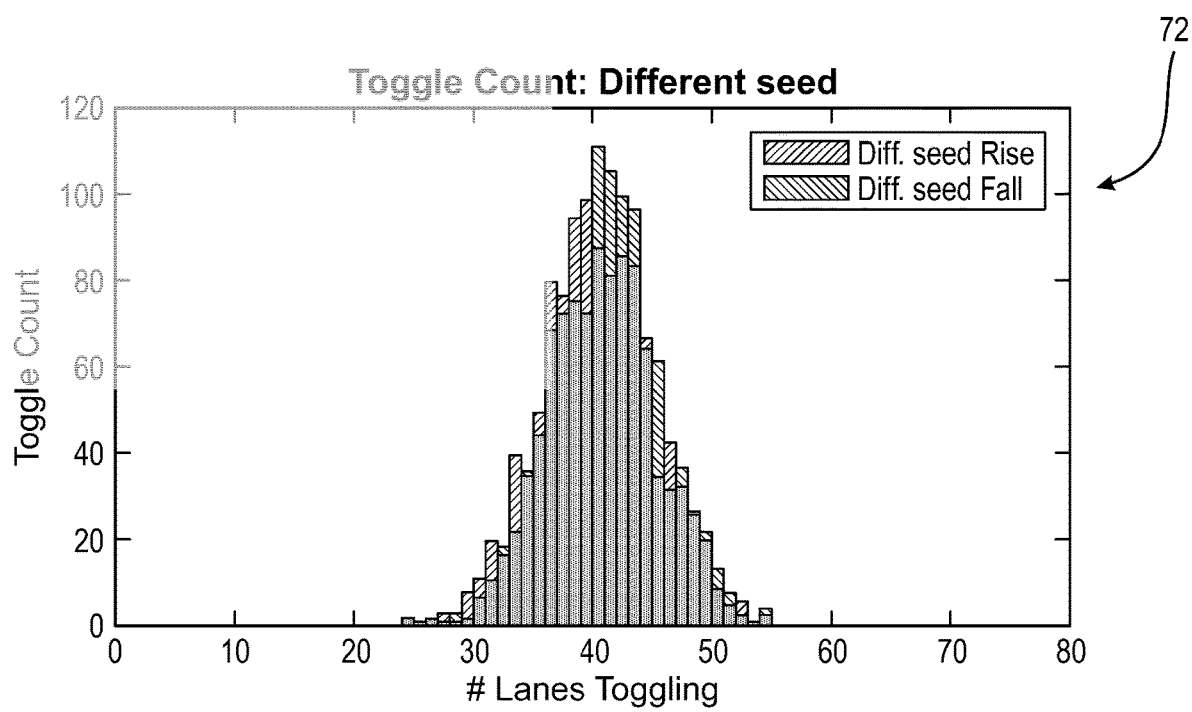
FIG. 6

TECHNOLOGY TO PROVIDE ACCURATE TRAINING AND PER-BIT DESKEW CAPABILITY FOR HIGH BANDWIDTH MEMORY INPUT/OUTPUT LINKS

TECHNICAL FIELD

Embodiments generally relate to memory structures. More particularly, embodiments relate to technology that provides accurate training and per-bit deskew capability for high bandwidth memory (HBM) input/output (IO) links.

BACKGROUND

High bandwidth memory (HBM) may be implemented as a tightly spaced (e.g., three-dimensional/3D-stacked) random access memory (RAM) with a wide interface (e.g., 1600+ lanes) to central processing unit (CPU) and/or graphics processing unit (GPU) components, where the CPU and/or GPU components may be integrated onto a system on chip (SoC) that is combined with the HBM into a semiconductor package. As end-of-life (EOL) speeds of HBM continue to increase, training margins may decrease due to power delivery noise and a larger impact of lane-to-lane skew in the interface. Conventional linear feedback shift register (LFSR) based training techniques may fail to address these growing concerns.

BRIEF DESCRIPTION OF THE DRAWINGS

The various advantages of the embodiments will become apparent to one skilled in the art by reading the following specification and appended claims, and by referencing the following drawings, in which:

FIG. 3 is an illustration of an example of a DWORD layout according to an embodiment;

FIG. 6 is a comparative plot of an example of a conventional toggling histogram and a toggling histogram according to an embodiment;

DESCRIPTION OF EMBODIMENTS

Current LFSR based training techniques may increase training time due to the involvement of multiple training steps (e.g., advanced training in addition to basic training). Indeed, advanced training may not be available during part sorting (e.g., manufacturing quality control), which can lead to a reduced manufacturing yield (e.g., more false positive failures). Moreover, the current LFSR architecture may prevent parity pins in the interface from toggling during training. The lack of parity pin toggling may in turn present challenges with respect to per-bit deskewing operations, which become more likely as HBM EOL speeds increase.

Figure 1:
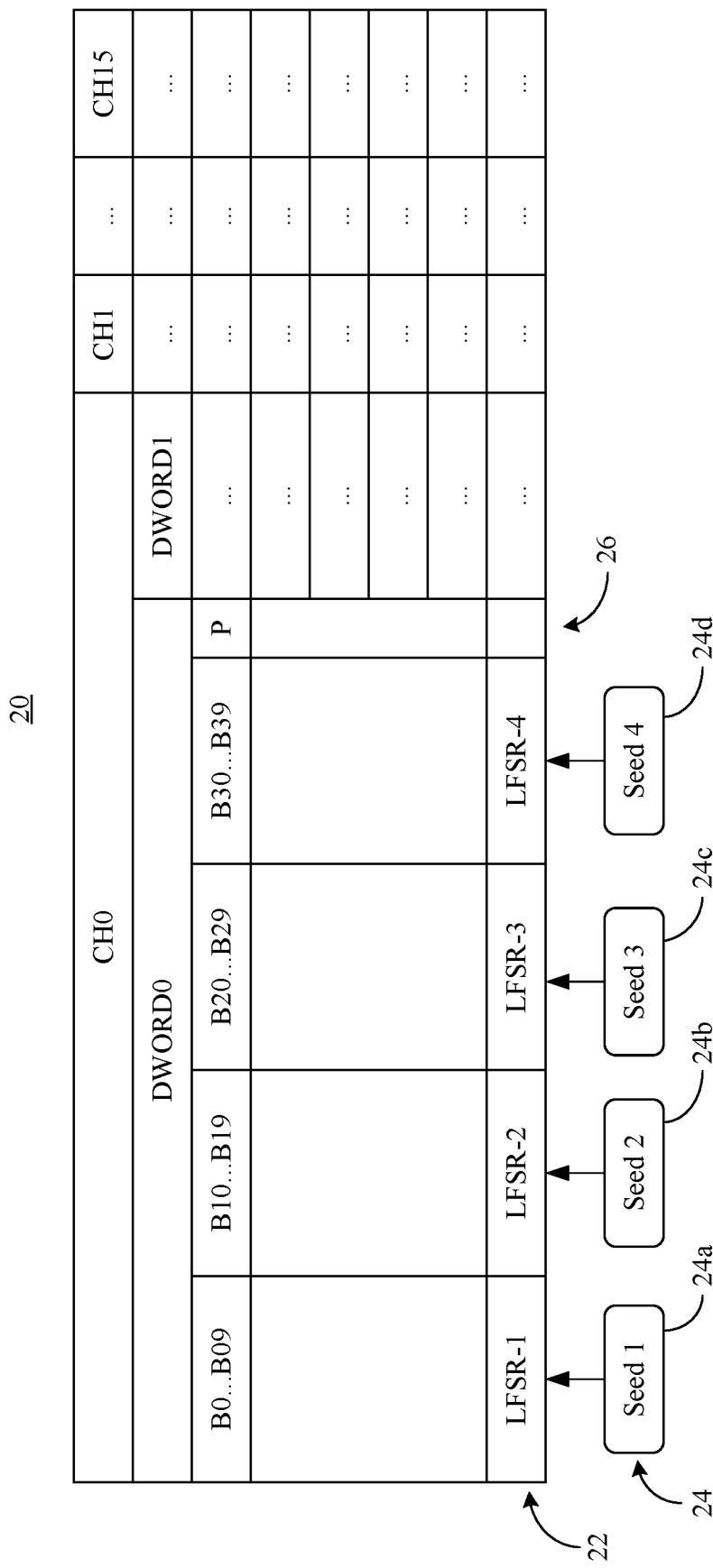
FIG. 1 is an illustration of an example of a link channel layout according to an embodiment.

Turning now to FIG. 1, a link channel layout 20 is shown for a tightly spaced memory link such as, for example, an HBM link. In the illustrated example, the link includes sixteen channels (CH0 . . . CH15), where each channel includes two data words (DWORD1, DWORD2). In an embodiment, each DWORD is associated with forty bits (B0-B39, e.g., including a data bus inversion/DBI bit, an error correction code/ECC bit, and a set of data bits, with each data bit representing a lane in the link) and a parity bit 26 (P). In general, the parity bit 26 acts as a check on the bits B0-B39 in such a way that the number of ones in the set plus the parity bit 26 is always even (or occasionally, always odd).

As will be discussed in greater detail, a plurality of LFSRs 22 (LFSR-1 . . . LFSR-4, e.g., multiple-input signature registers/MISRs) may correspond to each DWORD, wherein the LFSRs 22 are used to train the link. The training may involve, for example, centering strobe signals with respect to the data that is transmitted on the link, conducting deskew (e.g., per-bit), and so forth. In an embodiment, the LFSRs 22 are programmed with a polynomial and a plurality of seed values 24 (24a-24d). During training, the LFSRs 22 may shift bit values onto the lanes of the link, which in turn causes each lane to toggle between ones and zeros in a pseudorandom manner. More particularly, the polynomial and the seed values 24 may determine the pattern of the toggling.

In the illustrated example, a first seed value 24a (Seed 1) is programmed into a first LFSR (LFSR-1) and a second seed value 24b (Seed 2) is programmed into a second LFSR (LFSR-2). Similarly, a third seed value 24c (Seed 3) may be programmed into a third LFSR (LFSR-3), with a fourth seed value 24d (Seed 4) being programmed into a fourth LFSR (LFSR-4). If at least two of the seed values 24 differ from one another, the parity bit 26 may also toggle during the training of the link.

In an embodiment, forcing the parity bit 26 to toggle during training provides several advantages such as, for example, increasing the accuracy of training, decreasing training time by eliminating advanced training, increasing manufacturing yields during part sorting (e.g., eliminating false positive failures during manufacturing quality control), simplifying per-bit deskewing operations, and so forth. Indeed, selecting the seed values 24 to provide more active toggling further improves per-bit deskewing operations. Moreover, selecting the seed values 24 to provide more realistic toggling (e.g., from an expected traffic pattern perspective) may further enhance the training and subsequent performance of the link.

Figure 2:
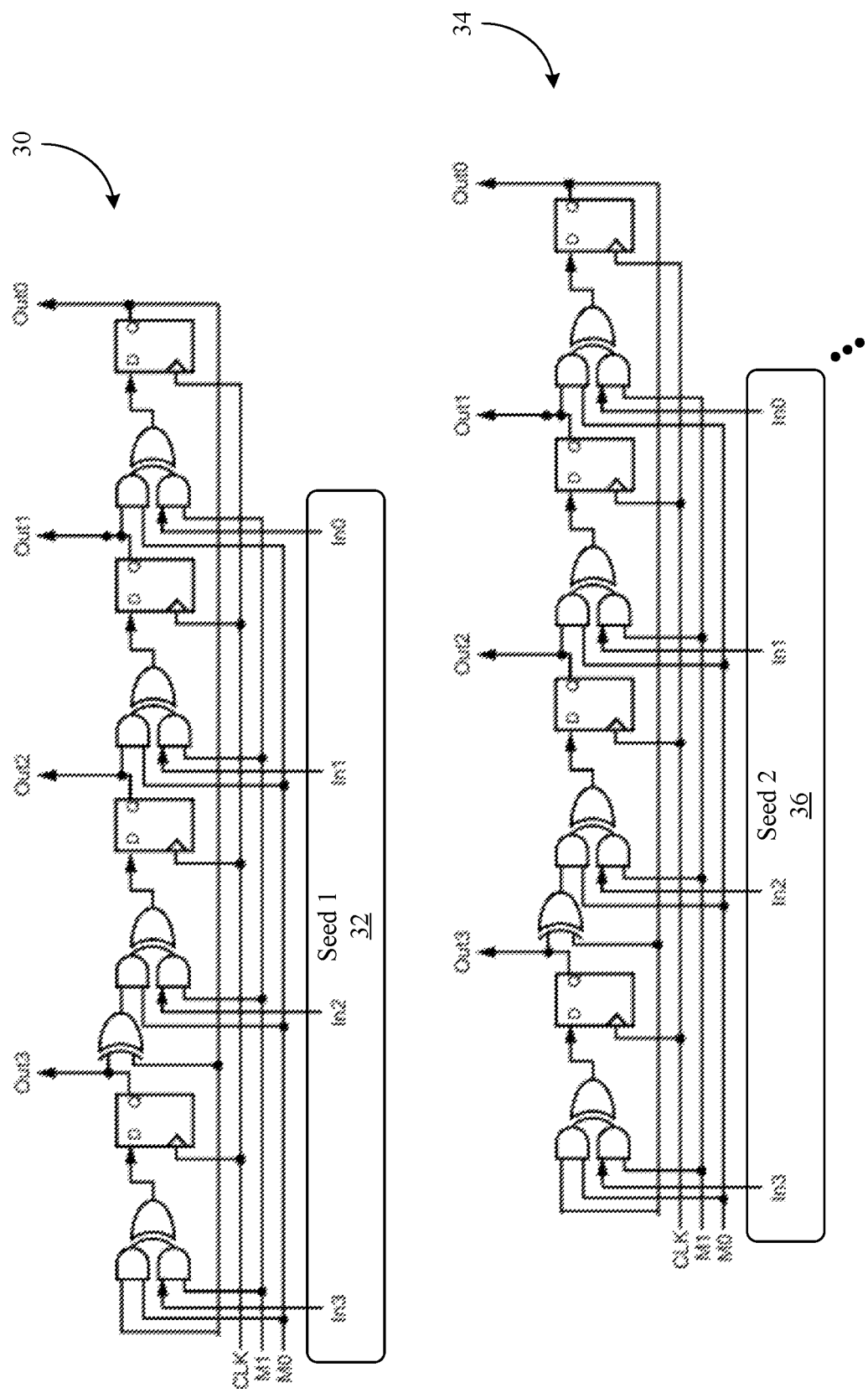
FIG. 2 is a schematic diagram of an example of a plurality of LFSRs according to an embodiment.

FIG. 2 shows a first LFSR 30 that includes a plurality of flip flops and an exclusive-OR feedback loop. In the illustrated example, the first LFSR 30 is programmed with a first seed value 32. Similarly, a second LFSR 34 may include a plurality of flip flops and an exclusive-OR feedback loop, wherein the second LFSR 34 is programmed with a second seed value 36 that is different from the first seed value 36. In an embodiment, the different seed values 32, 36 cause a parity bit associated with a DWORD to toggle while a link coupled to the LFSRs 30, 34 is being trained. The first LFSR 30 may be readily substituted for the LFSR-1 (FIG. 1) and the second LFSR 34 may be readily substituted for the LFSR-2 (FIG. 1).

Turning now to FIG. 3, a DWORD layout 40 is shown for an HBM link on an SoC. In general, HBM defines "loopback" modes that enable an SoC controller to train the data bus with respect to strobe signals (e.g., write data strobe/WDQS, read data strobe/RDQS). An LFSR with a fixed polynomial is defined per byte in DWORD and a separate fixed polynomial is defined for the command/address bus (AWORD). There are two DWORDS per channel and there are sixteen channels per HBM device. One AWORD is defined per channel, which is a 19-bit wide interface operating at half the speed of the DWORD. Within a DWORD, there are four bytes (10 bits including DBI and ECC). Due to speed considerations, each IO lane is internally 1:4 multiplexed to reduce internal timing constraints. This configuration implies four 40-bit LFSRs per DWORD and one 38-bit LFSR per AWORD. In an embodiment, all of the DWORD and AWORD LFSRs have the same polynomials respectively.

The DWORD layout 40 shows the four DWORD LFSRs with 10 bits per LFSR. The parity bit (e.g., DPAR) is not included in the LFSR output so that the correct parity is generated by the controller on every cycle. Strobes may also be excluded from the LFSR output for functional reasons. Embodiments may define the same polynomial and different initial values (e.g., seeds) for all LFSRs within a DWORD and DWORDs across all channels. Programming different seed values into the LFSRs addresses multiple concerns with regard to conventional approaches.

Parity toggle: HBM defines even parity. With all of the four LFSRs toggling in unison, the ones count would always be even and the parity bit would always zero (e.g., no parity toggling). If per-bit deskew is to be conducted (e.g., the total lane to lane timing skew might be 20% unit interval/UI at 6.4 Gbps), the parity bit cannot be trained without the technology described herein.

IO margins: In singled ended signaling, IO margins may be a strong function of simultaneous switching operation (SSO) noise. A training pattern much worse than the expected traffic pattern, while acceptable in systems with ample margins, may result in false part failures if the system has smaller margins. Additionally, the LFSR pattern may not support DBI due to design complexity while the functional traffic is DBI encoded. If the LFSR toggle density is not controlled, the lack of DBI encoding may worsen the SSO noise issue.

Thus, embodiments make the LFSR seed programmable and choose an appropriate seed value. More particularly, the parity issue may be addressed with a choice of a different seed for odd number of LFSRs per DWORD or any different seed can result in parity toggling.

Figure 4:
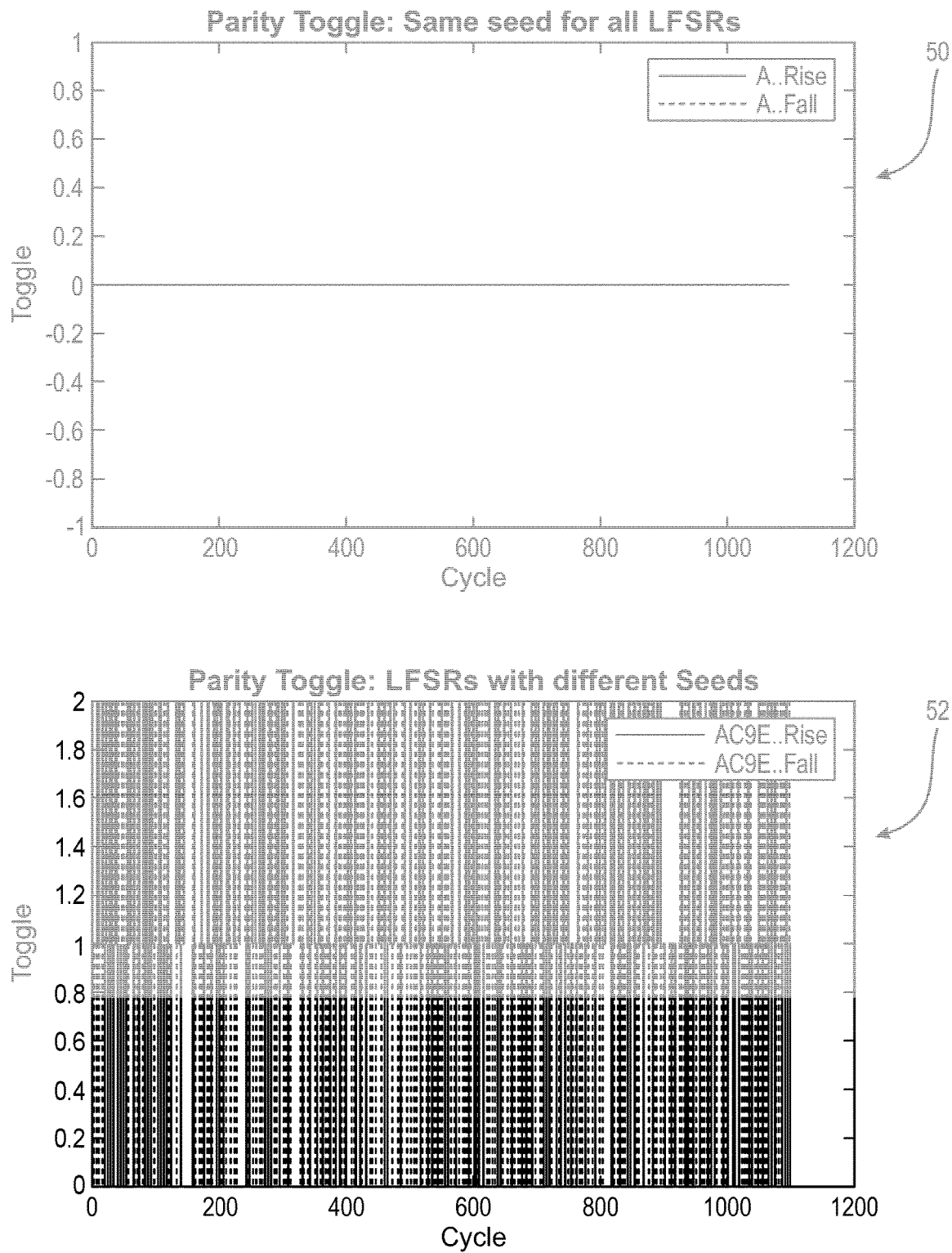
FIG. 4 is a comparative plot of an example of conventional parity toggling and parity toggling according to an embodiment.

For example, FIG. 4 shows a conventional parity toggling chart 50 (e.g., with the same seed for all LFSRs) and an enhanced parity toggling chart 52 (e.g., with different seeds for the LFSRs). In an embodiment, the enhanced parity toggling chart 52 is associated with more accurate link training and enhanced performance.

Figure 5:
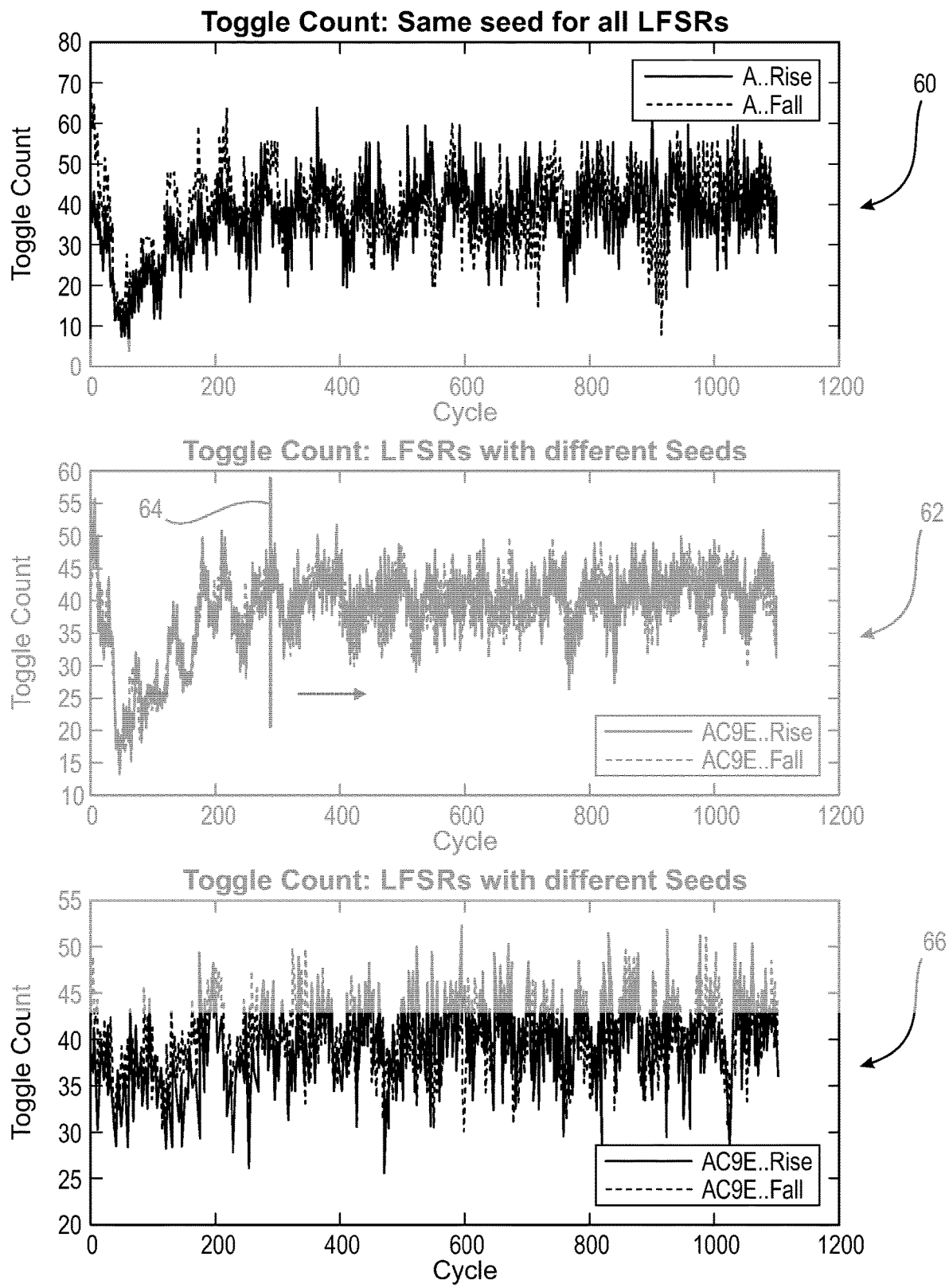
FIG. 5 is a comparative plot of an example of conventional toggle counts and toggle counts according to embodiments.

FIG. 5 shows a conventional toggle count chart 60 in which the same seed value is used for all LFSRs. By contrast, a first enhanced toggle count chart 62 demonstrates the data lane toggle behavior when the seed values for LFSR-1 through LFSR-4 are AAAAAAAAAAh, CCCCCCCCCCh, 9999999999h, and EEEEEEEEEEh, respectively. In the illustrated example, sufficient toggling occurs at a cycle count 64 for per-bit deskewing to be conducted on one or more lanes in the link. A second enhanced toggle count chart 66 demonstrates the data lane toggle behavior when the seed values for LFSR-1 through LFSR-4 are 0A49FFF4FD, 5B2F395B98, 60736BA0B2, and 405DB2C0BC, respectively. In the illustrated example, sufficient toggling occurs immediately (e.g., cycle 1) for per-bit deskewing to be conducted on one or more lanes in the link at a physical layer (PHY) of a memory controller.

FIG. 6 shows a conventional toggling histogram 70 in which the same seed value is used for all LFSRs. In the illustrated example, the toggle counts per cycle vary widely. By contrast, an enhanced toggling histogram 72 demonstrates that toggle density is much tighter, which more accurately represents actual traffic with DBI encoding. The technology described herein therefore ensures additional margin.

Figure 7:
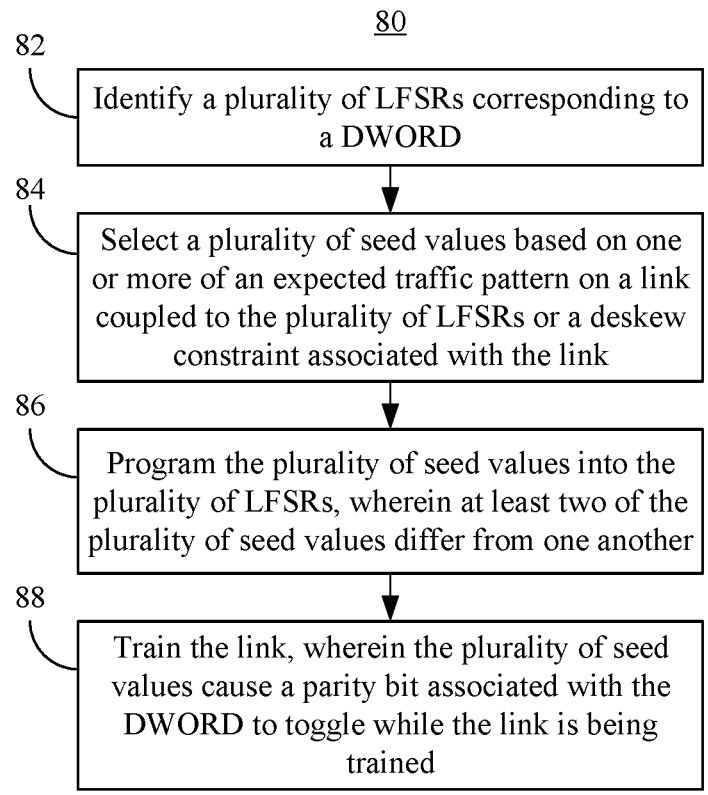
FIG. 7 is a flowchart of an example of a method of operating a performance-enhanced computing system according to an embodiment.

FIG. 7 shows a method 80 of operating a performance-enhanced computing system. The method 80 may be implemented in one or more modules as a set of logic instructions stored in a machine- or computer-readable storage medium such as random access memory (RAM), ROM, programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 80 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 82 identifies a plurality of LFSRs corresponding to a DWORD, where a plurality of seed values is automatically selected at block 84 based on one or more of an expected traffic pattern on a link coupled to the plurality of LFSRs or deskew constraint (e.g., maximum cycle count to complete per-bit deskewing operations on one or more lanes in the link at a PHY of a memory controller). In one example, the plurality of LFSRs consists of an even number of LFSRs. Block 86 programs the plurality of seed values into the plurality of LFSRs. In the illustrated example, at least two of the plurality of seed values differ from one another. In an embodiment, block 88 trains the link, wherein the plurality of seed values causes a parity bit associated with the DWORD to toggle while the link is being trained. Block 88 may include, for example, conducting per-bit deskew on one or more lanes in the link. Additionally, the link may be trained at a PHY of a memory controller, wherein the link is an HBM link in a SoC.

The method 80 therefore enhances performance at least to the extent that forcing parity bit toggling provides more accurate training, eliminates advanced training, decreases training time, increases manufacturing yields during part sorting (e.g., eliminating false positive failures during manufacturing quality control), simplifies per-bit deskewing operations, and so forth. Indeed, selecting the seed values to provide more active toggling further simplifies per-bit deskewing operations. Moreover, selecting the seed values to provide more realistic toggling (e.g., from an expected traffic pattern perspective) may further enhance the training and subsequent performance of the link.

Figure 8:
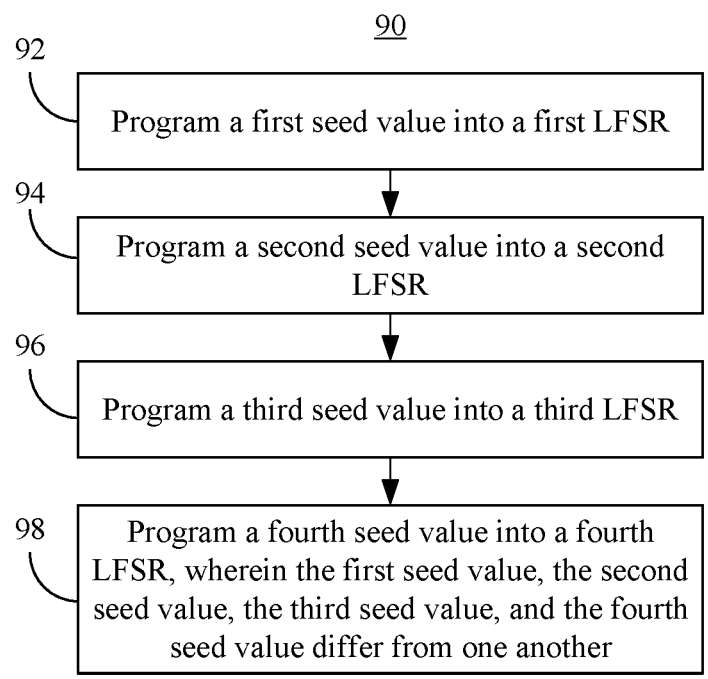
FIG. 8 is a flowchart of an example of a method of programming seed values into LFSRs according to an embodiment.

FIG. 8 shows a method 90 of programming seed values into LFSRs. The method 90 may readily be incorporated into block 86 (FIG. 7), already discussed. More particularly, the method 90 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 92 programs a first seed value into a first LFSR, where a second seed value is programmed into a second LFSR at block 94. In an embodiment, block 96 programs a third seed value into a third LFSR and block 98 programs a fourth seed value into a fourth LFSR. In the illustrated example, the first seed value, the second seed value, the third seed value, and the fourth seed value differ from one another. Ensuring that all of the seed values are different from one another may further enhance the accuracy of the training and the performance of the link.

Figure 9:
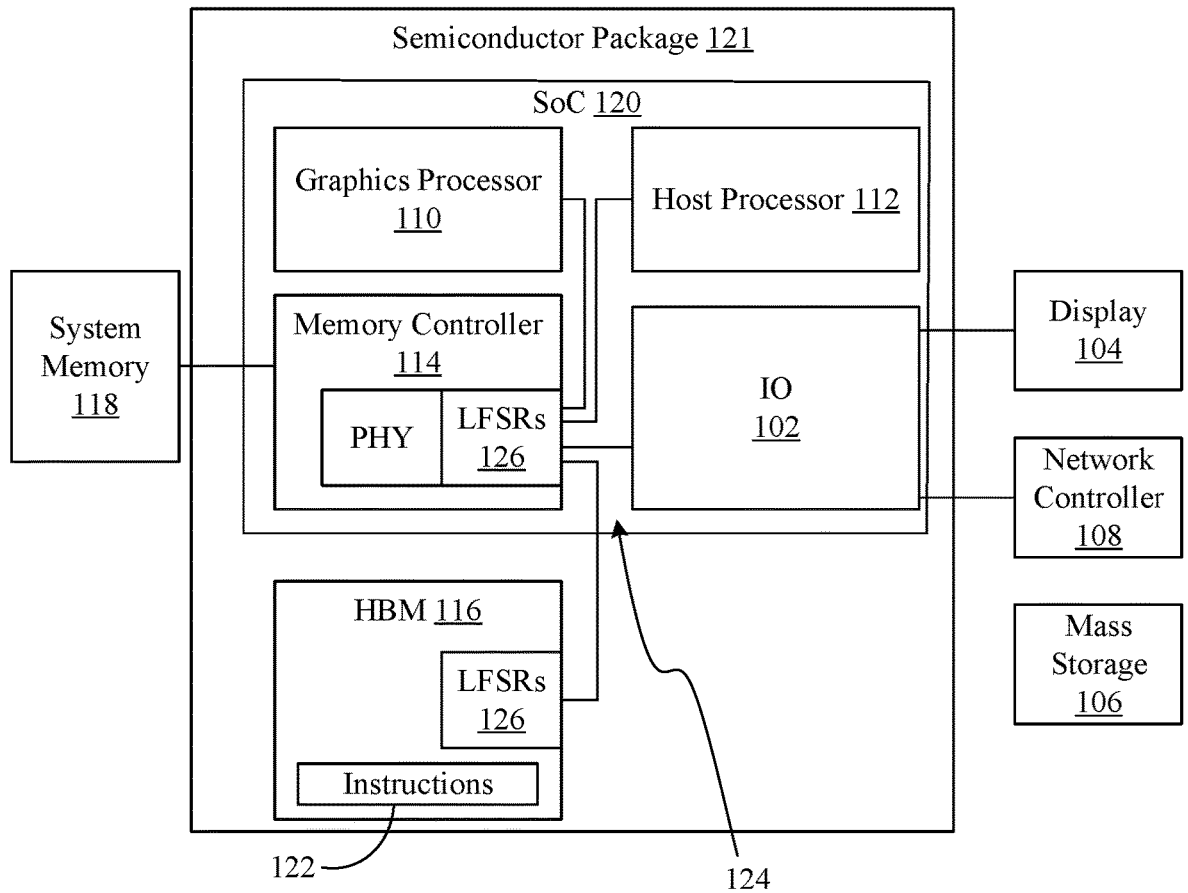
FIG. 9 is a block diagram of an example of a performance-enhanced computing system according to an embodiment.

FIG. 9 shows a performance-enhanced computing system 100. The system 100 may be part of a server, desktop computer, notebook computer, tablet computer, convertible tablet, smart television (TV), personal digital assistant (PDA), mobile Internet device (MID), smart phone, wearable device, media player, vehicle, robot, Internet of Things (IoT) component, etc., or any combination thereof. In the illustrated example, an input/output (IO) module 102 is communicatively coupled to a display 104 (e.g., liquid crystal display/LCD, light emitting diode/LED display, touch screen), mass storage 106 (e.g., flash memory, hard disk drive/HDD, optical disc, solid-state drive/SSD), and a network controller 108 (e.g., wired, wireless).

The system 100 may also include a graphics processor 110, a host processor 112 (e.g., CPU), a memory controller 114, and an HBM 116 (e.g., 3D-stacked RAM), wherein the illustrated memory controller 114 communicates with a system memory 118 over a bus or other suitable communication interface. The host processor 112, the graphics processor 110, the memory controller 114, and the IO module 102 are integrated onto a shared semiconductor die 120 in a system on chip (SoC) architecture. In an embodiment, the HBM 116 and the shared semiconductor die 120 are incorporated into a shared semiconductor package 121.

The illustrated HBM 116 includes instructions 122 (e.g., logic instructions, configurable logic, fixed-functionality hardware logic, etc., or any combination thereof) to implement one or more aspects of the method 80 (FIG. 7) and/or the method 90 (FIG. 8), already discussed. Thus, execution of the instructions 122 by the memory controller 114 may cause the computing system 100 to program a plurality of seed values into a plurality of LFSRs 126, wherein the plurality of LFSRs 126 correspond to a DWORD and at least two of the plurality of seed values differ from one another. Execution of the instructions 122 may also cause the computing system 100 to train a link 124 coupled to the plurality of LFSRs 126, wherein the plurality of seed values cause a parity bit associated with the DWORD to toggle while the link 124 is being trained. In the illustrated example, the same LFSRs 126 are implemented in both the memory controller 114 and the HBM 116. In an embodiment, execution of the instructions 122 also causes the computing system 100 to automatically select the plurality of seed values based on one or more of an expected traffic pattern on the link 124 (e.g., after training) or a deskew constraint associated with the link 124. In one example, the HBM 116 is a special class of memory called "2.5D" in which the memory is co-located on the same substrate as the memory controller 114. In such a case, the instructions 122 may reside in the bottom/base die of the HBM 116.

The computing system 100 is therefore considered performance-enhanced at least to the extent that forcing parity bit toggling provides more accurate training, eliminates advanced training, decreases training time, increases manufacturing yields during part sorting (e.g., eliminating false positive failures during manufacturing quality control), simplifies per-bit deskewing operations, and so forth. Indeed, selecting the seed values to provide more active toggling further simplifies per-bit deskewing operations. Moreover, selecting the seed values to provide more realistic toggling (e.g., from an expected traffic pattern perspective) may further enhance the training and subsequent performance of the link 124.

In an embodiment, the HBM 116 is a memory structure that may include non-volatile memory and/or volatile memory. Non-volatile memory is a storage medium that does not require power to maintain the state of data stored by the medium. In one embodiment, the memory structure is a block addressable storage device, such as those based on NAND or NOR technologies. A storage device may also include future generation nonvolatile devices, such as a three-dimensional (3D) crosspoint memory device, or other byte addressable write-in-place nonvolatile memory devices. In one embodiment, the storage device may be or may include memory devices that use silicon-oxide-nitride-oxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The term "storage device" may refer to the die itself and/or to a packaged memory product. In some embodiments, 3D crosspoint memory may comprise a transistor-less stackable cross point architecture in which memory cells sit at the intersection of word lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD235, JESD218, JESD219, JESD220-1, JESD223B, JESD223-1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at jedec.org). Such standards (and similar standards) may be referred to as DDR-based standards and communication interfaces of the storage devices that implement such standards may be referred to as DDR-based interfaces.

Figure 10:
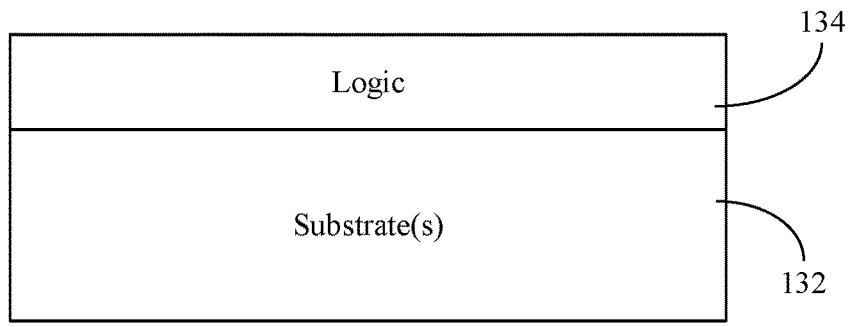
FIG. 10 is an illustration of an example of a semiconductor package apparatus according to an embodiment.

FIG. 10 shows a semiconductor apparatus 130 (e.g., chip, die) that includes one or more substrates 132 (e.g., silicon, sapphire, gallium arsenide) and logic 134 (e.g., transistor array and other integrated circuit/IC components) coupled to the substrate(s) 132. The logic 134, which may be implemented at least partly in configurable logic and/or fixed-functionality hardware logic, may generally implement one or more aspects of the method 80 (FIG. 7) and/or the method 90 (FIG. 8), already discussed. Thus, the logic 134 may program a plurality of seed values into a plurality of LFSRs, wherein the plurality of LFSRs correspond to a DWORD and at least two of the plurality of seed values differ from one another. The logic 134 may also train a link coupled to the plurality of LFSRs, wherein the plurality of seed values cause a parity bit associated with the DWORD to toggle while the link is being trained. In an embodiment, the logic 134 also automatically selects the plurality of seed values based on one or more of an expected traffic pattern on the link (e.g., after training) or a deskew constraint associated with the link.

The apparatus 130 is therefore considered performance-enhanced at least to the extent that forcing parity bit toggling provides more accurate training, eliminates advanced training, decreases training time, increases manufacturing yields during part sorting (e.g., eliminating false positive failures during manufacturing quality control), simplifies per-bit deskewing operations, and so forth. Indeed, selecting the seed values to provide more active toggling further simplifies per-bit deskewing operations. Moreover, selecting the seed values to provide more realistic toggling (e.g., from an expected traffic pattern perspective) may further enhance the training and subsequent performance of the link.

In one example, the logic 134 includes transistor channel regions that are positioned (e.g., embedded) within the substrate(s) 132. Thus, the interface between the logic 134 and the substrate(s) 132 may not be an abrupt junction. The logic 134 may also be considered to include an epitaxial layer that is grown on an initial wafer of the substrate(s) 132.

Figure 11:
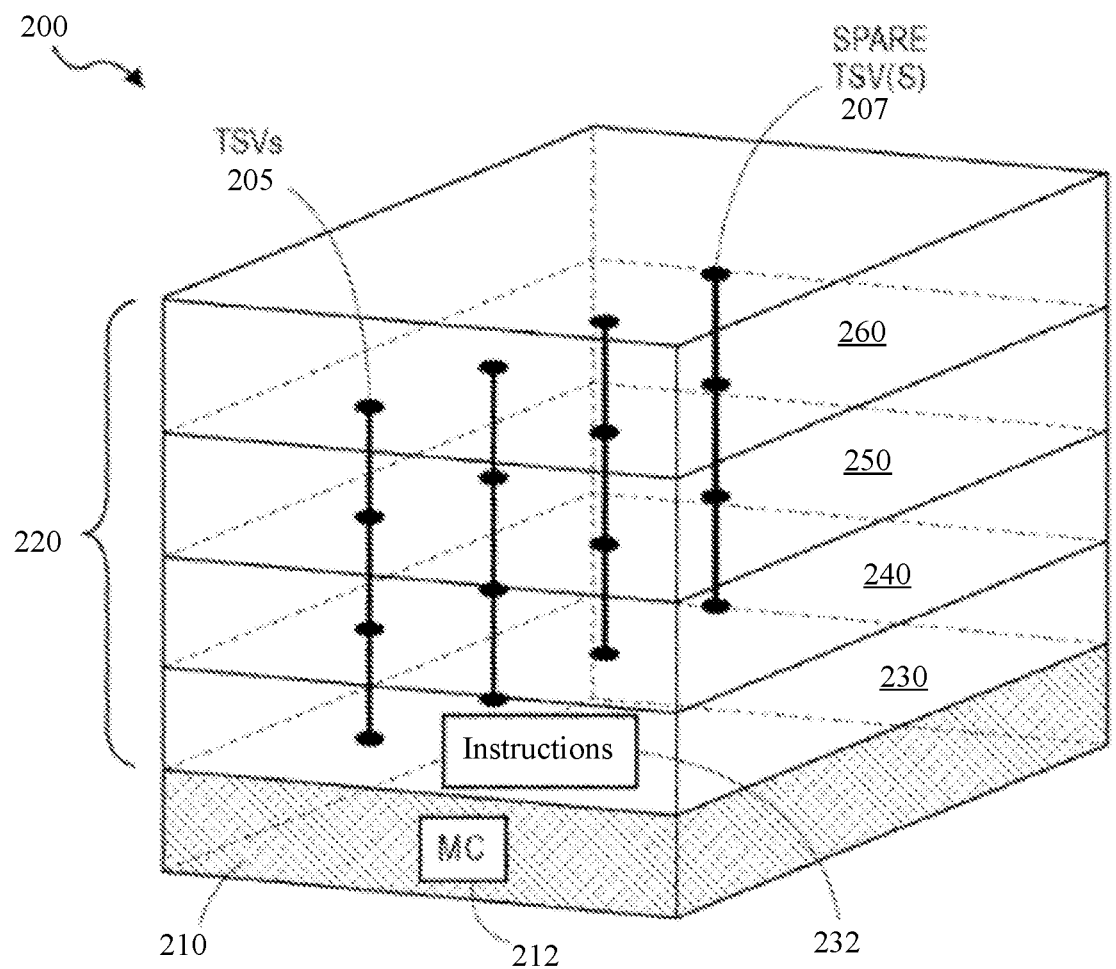
FIG. 11 is an illustration of an example of a 3D-stacked memory according to an embodiment.

FIG. 11 illustrates an embodiment of a 3D-stacked memory. In this illustration, a 3D-stacked memory device 200, such as a WideIO memory device, includes a system element 210 coupled with one or more DRAM memory die layers 220, also referred to herein as the memory stack. In some embodiments, the system element 210 may be a system on chip (SoC) or other similar element. In this illustration, the DRAM memory die layers 220 include four memory die layers, these layers being a first memory die layer 230, a second memory die layer 240, a third memory die layer 250, and a fourth memory die layer 260. However, embodiments are not limited to any particular number of memory die layers 220 in the memory stack, and may include a greater or smaller number of memory die layers 220. Each die layer 220 may include one or more slices or portions, and may have one or more different channels. Each die layer may include a temperature compensated self-refresh (TCSR) circuit to address thermal issues, where the TCSR and a mode register (MR) may be a part of management logic of the device, and where the MR may include thermal offset bit(s) for adjustment of refresh rates by the TCSR. The die layers 220 and the system element 210 may be thermally coupled together.

Among other elements, the system element 210 may include a memory controller (MC) 212, such as a WideIO memory controller, for the memory stack. In some embodiments, each memory die layer 220 (with the possible exception of the top (or outermost) memory die layer, such as the fourth memory die layer 260 in this illustration) includes a plurality of through silicon vias (TSVs) 205 to provide paths through the memory die layers 220, as well as one or more spare TSVs 207.

The stacked memory device 200 may include instructions 232 (e.g., logic instructions, configurable logic and/or fixed-functionality hardware logic), to implement one or more aspects of the method 80 (FIG. 7) and/or the method 90 (FIG. 8), already discussed. Thus, execution of the instructions 232 by the MC 212 may cause the MC 212 to program a plurality of seed values into a plurality of LFSRs, wherein the plurality of LFSRs correspond to a DWORD and at least two of the plurality of seed values differ from one another. Execution of the instructions 232 may also cause the MC 212 to train a link coupled to the plurality of LFSRs, wherein the plurality of seed values cause a parity bit associated with the DWORD to toggle while the link is being trained. In an embodiment, execution of the instructions 232 also causes the MC 212 to automatically select the plurality of seed values based on one or more of an expected traffic pattern on the link (e.g., after training) or a deskew constraint associated with the link.

Although the memory device 200 is shown as a full 3D device with the MC 212 as the base die, other configurations may be used. For example, memory device 200 may also be configured as 2.5D HBM memory in which the memory device 200 is co-located on the same substrate as the MC 212 and the instructions 232 reside in the base die of the memory device 200.

ADDITIONAL NOTES AND EXAMPLES

Example 1 includes a memory controller comprising one or more substrates and logic coupled to the one or more substrates, wherein the logic is at least partly implemented in one or more of configurable or fixed-functionality hardware, and the logic coupled to the one or more substrates is to program a plurality of seed values into a plurality of linear feedback shift registers (LFSRs), wherein the plurality of LFSRs correspond to a data word and at least two of the plurality of seed values differ from one another, and train a link coupled to the plurality of LFSRs.

Example 2 includes the memory controller of Example 1, wherein the logic coupled to the one or more substrates is to select the plurality of seed values based on one or more of an expected traffic pattern on the link or a deskew constraint associated with the link, wherein the plurality of seed values are to cause a parity bit associated with the data word to toggle while the link is being trained.

Example 3 includes the memory controller of Example 1, wherein to train the link, the logic coupled to the one or more substrates is to conduct a per-bit deskew on one or more lanes in the link.

Example 4 includes the memory controller of Example 1, wherein the plurality of LFSRs is to consist of an even number of LFSRs.

Example 5 includes the memory controller of Example 1, wherein the link is to be trained at a physical layer of a memory controller, and wherein the link is to be a high bandwidth memory link in a system on chip.

Example 6 includes the memory controller of any one of Examples 1 to 5, wherein to program the plurality of seed values into the plurality of LFSRs, the logic coupled to the one or more substrates is to program a first seed value into a first LFSR, program a second seed value into a second LFSR, program a third seed value into a third LFSR, and program a fourth seed value into a fourth LFSR, wherein the first seed value, the second seed value, the third seed value, and the fourth seed value differ from one another.

Example 7 includes a computing system comprising a memory controller including a plurality of linear feedback shift registers (LFSRs) corresponding to a data word, a link coupled to the plurality of LFSRs, a memory structure coupled to the memory controller, the memory structure including a set of instructions, which when executed by the memory controller, cause the memory controller to program a plurality of seed values into the plurality of LFSRs, wherein at least two of the plurality of seed values differ from one another, and train the link coupled to the plurality of LFSRs.

Example 8 includes the computing system of Example 7, wherein the instructions, when executed, cause the memory controller to select the plurality of seed values based on one or more of an expected traffic pattern on the link or a deskew constraint associated with the link, wherein the plurality of seed values are to cause a parity bit associated with the data word to toggle while the link is being trained.

Example 9 includes the computing system of Example 7, wherein to train the link, the instructions, when executed, cause the memory controller to conduct a per-bit deskew on one or more lanes in the link.

Example 10 includes the computing system of Example 7, wherein the plurality of LFSRs consists of an even number of LFSRs.

Example 11 includes the computing system of Example 7, wherein the link is to be trained at a physical layer of the memory controller, wherein the computing system includes a system on chip (SoC), and wherein the link is a high bandwidth memory link in the SoC.

Example 12 includes the computing system of any one of Examples 7 to 11, wherein to program the plurality of seed values into the plurality of LFSRs, the instructions, when executed, cause the memory controller to program a first seed value into a first LFSR, program a second seed value into a second LFSR, program a third seed value into a third LFSR, and program a fourth seed value into a fourth LFSR, wherein the first seed value, the second seed value, the third seed value, and the fourth seed value differ from one another.

Example 13 includes at least one computer readable storage medium comprising a set of instructions, which when executed by a computing system, cause the computing system to program a plurality of seed values into a plurality of linear feedback shift registers (LFSRs), wherein the plurality of LFSRs correspond to a data word and at least two of the plurality of seed values differ from one another, and train a link coupled to the plurality of LFSRs.

Example 14 includes the at least one computer readable storage medium of Example 13, wherein the instructions, when executed, cause the computing system to select the plurality of seed values based on one or more of an expected traffic pattern on the link or a deskew constraint associated with the link, wherein the plurality of seed values are to cause a parity bit associated with the data word to toggle while the link is being trained.

Example 15 includes the at least one computer readable storage medium of Example 13, wherein to train the link, the instructions, when executed, cause the computing system to conduct a per-bit deskew on one or more lanes in the link.

Example 16 includes the at least one computer readable storage medium of Example 13, wherein the plurality of LFSRs is to consist of an even number of LFSRs.

Example 17 includes the at least one computer readable storage medium of Example 13, wherein the link is to be trained at a physical layer of a memory controller, and wherein the link is to be a high bandwidth memory link in a system on chip.

Example 18 includes the at least one computer readable storage medium of any one of Examples 13 to 17, wherein to program the plurality of seed values into the plurality of LFSRs, the instructions, when executed, cause the computing system to program a first seed value into a first LFSR, program a second seed value into a second LFSR, program a third seed value into a third LFSR, and program a fourth seed value into a fourth LFSR, wherein the first seed value, the second seed value, the third seed value, and the fourth seed value differ from one another.

Example 19 includes a method comprising programming a plurality of seed values into a plurality of linear feedback shift registers (LFSRs), wherein the plurality of LFSRs correspond to a data word and at least two of the plurality of seed values differ from one another, and training a link coupled to the plurality of LFSRs.

Example 20 includes the method of Example 19, further including selecting the plurality of seed values based on one or more of an expected traffic pattern on the link or a deskew constraint associated with the link, wherein the plurality of seed values cause a parity bit associated with the data word to toggle while the link is being trained.

Example 21 includes the method of Example 19, wherein training the link includes conducting a per-bit deskew on one or more lanes in the link.

Example 22 includes the method of Example 19, wherein the plurality of LFSRs consist of an even number of LFSRs.

Example 23 includes the method of Example 19, wherein the link is trained at a physical layer of a memory controller, and wherein the link is a high bandwidth memory link in a system on chip.

Example 24 includes the method of any one of Examples 19 to 23, wherein programming the plurality of seed values into the plurality of LFSRs includes programming a first seed value into a first LFSR, programming a second seed value into a second LFSR, programming a third seed value into a third LFSR, and programming a fourth seed value into a fourth LFSR, wherein the first seed value, the second seed value, the third seed value, and the fourth seed value differ from one another.

Example 25 includes means for performing the method of any one of Examples 19 to 24.

Technology described herein may therefore enable more effective training and margining. For example, training accuracy may be increased even in the presence of power delivery noise factors such as higher power consumption (e.g., with similar package power delivery resources), unmatched clocking architectures, and so forth. By contrast, a common seed for all the LFSRs may cause large SSO noise in training, which may not be representative of the actual noise in functional mode (e.g., all four bytes within a pseudo channel sending the same pattern is very unlikely). While this pessimistic result may be acceptable in situations where the system has ample margins, such an approach may be detrimental in systems with low margins. Such an approach may further complicate the issue if margins from such pessimistic data patterns are used as pass fail criteria (during sort, for example).

Technology described herein also enables per-bit deskew. Memory suppliers are estimating about 20% UI of total lane-to-lane skew at 6.4 Gbps (current EOL speed). This challenge may be exacerbated further if the speeds are pushed higher than current EOL speeds. With conventional schemes, some parity pins will not toggle as there are even number LFSRs per DWORD and even parity is defined. In such a case, the controller either approximates eye width for non-toggling lanes or runs advanced training. With more than 1600 lanes per HBM device, multiple training steps may be expensive in terms of training time without the technology described herein.

Technology described herein also enables more effective post silicon screening. A pessimistic basic training/margining flow may result in artificially failing pass-fail criteria. Such an approach may involve enabling additional training steps and/or lowering the speed of HBM interface speed. As a result, test time may become more expensive or the system performance may decrease without the technology described herein.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B, and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A memory controller comprising:
   one or more substrates; and
   logic coupled to the one or more substrates, wherein the logic is at least partly implemented in one or more of configurable or fixed-functionality hardware, and the logic coupled to the one or more substrates is to:
   program a plurality of seed values into a plurality of linear feedback shift registers (LFSRs), wherein the plurality of LFSRs correspond to a data word and at least two of the plurality of seed values differ from one another, and wherein each of the plurality of seed values differ from one another and are automatically selected to each differ from one another based on one or more of an expected traffic pattern on a link coupled to the plurality of LFSRs or a deskew constraint associated with the link; and
   train the link coupled to the plurality of LFSRs.

2. The memory controller of claim 1, wherein the plurality of seed values are to cause a parity bit associated with the data word to toggle while the link is being trained.

3. The memory controller of claim 1, wherein to train the link, the logic coupled to the one or more substrates is to conduct a per-bit deskew on one or more lanes in the link.

4. The memory controller of claim 1, wherein the plurality of LFSRs is to consist of an even number of LFSRs.

5. The memory controller of claim 1, wherein the link is to be trained at a physical layer of a memory controller, and wherein the link is to be a high bandwidth memory link in a system on chip.

6. The memory controller of claim 1, wherein to program the plurality of seed values into the plurality of LFSRs, the logic coupled to the one or more substrates is to:
   program a first seed value into a first LFSR;
   program a second seed value into a second LFSR;
   program a third seed value into a third LFSR; and
   program a fourth seed value into a fourth LFSR, wherein the first seed value, the second seed value, the third seed value, and the fourth seed value differ from one another.

7. A computing system comprising:
   a memory controller including a plurality of linear feedback shift registers (LFSRs) corresponding to a data word;

a link coupled to the plurality of LFSRs;

a memory structure coupled to the memory controller, the memory structure including a set of instructions, which when executed by the memory controller, cause the memory controller to:

program a plurality of seed values into the plurality of LFSRs, wherein at least two of the plurality of seed values differ from one another, and wherein each of the plurality of seed values differ from one another and are automatically selected to each differ from one another based on one or more of an expected traffic pattern on a link coupled to the plurality of LFSRs or a deskew constraint associated with the link; and train the link coupled to the plurality of LFSRs.

8. The computing system of claim 7, wherein the plurality of seed values are to cause a parity bit associated with the data word to toggle while the link is being trained.

9. The computing system of claim 7, wherein to train the link, the instructions, when executed, cause the memory controller to conduct a per-bit deskew on one or more lanes in the link.

10. The computing system of claim 7, wherein the plurality of LFSRs consists of an even number of LFSRs.

11. The computing system of claim 7, wherein the link is to be trained at a physical layer of the memory controller, wherein the computing system includes a system on chip (SoC), and wherein the link is a high bandwidth memory link in the SoC.

12. The computing system of claim 7, wherein to program the plurality of seed values into the plurality of LFSRs, the instructions, when executed, cause the memory controller to:
program a first seed value into a first LFSR;
program a second seed value into a second LFSR;
program a third seed value into a third LFSR; and
program a fourth seed value into a fourth LFSR, wherein the first seed value, the second seed value, the third seed value, and the fourth seed value differ from one another.

13. At least one non-transitory computer readable storage medium comprising a set of instructions, which when executed by a computing system, cause the computing system to:
program a plurality of seed values into a plurality of linear feedback shift registers (LFSRs), wherein the plurality of LFSRs correspond to a data word and at least two of the plurality of seed values differ from one another, and wherein each of the plurality of seed values differ from one another and are automatically selected to each differ from one another based on one or more of an expected traffic pattern on a link coupled to the plurality of LFSRs or a deskew constraint associated with the link; and train the link coupled to the plurality of LFSRs.

14. The at least one non-transitory computer readable storage medium of claim 13, wherein the plurality of seed values are to cause a parity bit associated with the data word to toggle while the link is being trained.

15. The at least one non-transitory computer readable storage medium of claim 13, wherein to train the link, the instructions, when executed, cause the computing system to conduct a per-bit deskew on one or more lanes in the link.

16. The at least one non-transitory computer readable storage medium of claim 13, wherein the plurality of LFSRs is to consist of an even number of LFSRs.

17. The at least one non-transitory computer readable storage medium of claim 13, wherein the link is to be trained at a physical layer of a memory controller, and wherein the link is to be a high bandwidth memory link in a system on chip.

18. The at least one non-transitory computer readable storage medium of claim 13, wherein to program the plurality of seed values into the plurality of LFSRs, the instructions, when executed, cause the computing system to:
program a first seed value into a first LFSR;
program a second seed value into a second LFSR;
program a third seed value into a third LFSR; and
program a fourth seed value into a fourth LFSR, wherein the first seed value, the second seed value, the third seed value, and the fourth seed value differ from one another.

19. A method comprising:
programming a plurality of seed values into a plurality of linear feedback shift registers (LFSRs), wherein the plurality of LFSRs correspond to a data word and at least two of the plurality of seed values differ from one another, and wherein each of the plurality of seed values differ from one another and are automatically selected to each differ from one another based on one or more of an expected traffic pattern on a link coupled to the plurality of LFSRs or a deskew constraint associated with the link; and
training the link coupled to the plurality of LFSRs.

20. The method of claim 19, wherein the plurality of seed values cause a parity bit associated with the data word to toggle while the link is being trained.

* * * * *